(12) United States Patent
Burton et al.

(10) Patent No.: US 9,902,440 B2
(45) Date of Patent: Feb. 27, 2018

(54) ADJUSTABLE SPARE TIRE CARRIER

(71) Applicants: Jonathon S Burton, Belleville, MI (US); Marcel A Tang, Belle River (CA); Christopher J Duke, White Lake, MI (US)

(72) Inventors: Jonathon S Burton, Belleville, MI (US); Marcel A Tang, Belle River (CA); Christopher J Duke, White Lake, MI (US)

(73) Assignee: FCA US LLC, Auburn Hills, MI (US)

( * ) Notice: Subject to any disclaimer, the term of this patent is extended or adjusted under 35 U.S.C. 154(b) by 47 days.

(21) Appl. No.: 14/972,274

(22) Filed: Dec. 17, 2015

(65) Prior Publication Data

US 2017/0174273 A1 Jun. 22, 2017

(51) Int. Cl.
*B62D 43/02* (2006.01)

(52) U.S. Cl.
CPC .................. *B62D 43/02* (2013.01)

(58) Field of Classification Search
CPC .................................... B62D 43/02
USPC ....................................... 224/42.21
See application file for complete search history.

(56) References Cited

U.S. PATENT DOCUMENTS

| | | | | |
|---|---|---|---|---|
| 1,472,983 A * | 11/1923 | Lawrence | ............... | B62D 43/02 |
| | | | | 224/42.21 |
| 1,548,985 A * | 8/1925 | Dickenson | ............. | B62D 43/02 |
| | | | | 296/37.2 |
| 3,513,971 A * | 5/1970 | Wikdahl | ............ | B01D 19/0068 |
| | | | | 209/3 |
| 3,916,317 A * | 10/1975 | Gibson | .................... | H03J 1/045 |
| | | | | 116/244 |
| 4,767,038 A * | 8/1988 | McVicar | ................. | B62D 43/02 |
| | | | | 224/42.12 |
| 4,850,518 A * | 7/1989 | Salmon | ................... | B62D 43/04 |
| | | | | 224/42.23 |
| 5,076,477 A * | 12/1991 | Colgan | ................ | B62D 43/005 |
| | | | | 206/304.1 |
| 5,560,629 A * | 10/1996 | Allard | ...................... | B60D 1/66 |
| | | | | 280/414.2 |
| 7,922,048 B2 | 4/2011 | Smith et al. | | |

(Continued)

FOREIGN PATENT DOCUMENTS

JP 06099860 A * 4/1994

OTHER PUBLICATIONS

Synergy Manufacturing Website, http://www.synergymfg.com, visited Jul. 31, 2017.*

(Continued)

*Primary Examiner* — Scott McNurlen
(74) *Attorney, Agent, or Firm* — Ralph E. Smith (57) ABSTRACT

A carrier for a spare tire of a vehicle includes a base, a mount, and a locking member. The base is configured to be coupled to the vehicle. The mount is coupled to the base and pivotable relative to the base about a pivot axis. The mount is configured to support the spare tire for common rotation with the mount about the pivot axis. The pivot axis is offset from a central axis of the spare tire when the spare tire is supported by the mount. The locking member is movable between a locked position wherein the locking member engages the mount and the base to prevent relative movement therebetween, and an unlocked position wherein the mount is pivotable relative to the base.

15 Claims, 6 Drawing Sheets

(56) References Cited

U.S. PATENT DOCUMENTS

| | | | |
|---|---|---|---|
| D698,224 S | 1/2014 | Ridges | |
| 2006/0285953 A1* | 12/2006 | Wooten | B62D 43/02 |
| | | | 414/463 |
| 2007/0039987 A1* | 2/2007 | Osenkowski | B62D 43/02 |
| | | | 224/504 |
| 2009/0120976 A1* | 5/2009 | MacKarvich | B62D 43/02 |
| | | | 224/42.21 |

OTHER PUBLICATIONS

Synergy Jeep JK Spare Tire Relocation Bracket http://www.synergymfg.com/Synergy-Jeep-JK-Spare-Tire-Relocation-Bracket-p-17958.html (Accessed Nov. 24, 2015).

* cited by examiner

ADJUSTABLE SPARE TIRE CARRIER

FIELD

The present disclosure relates to an adjustable spare tire carrier.

BACKGROUND

This section provides background information related to the present disclosure and is not necessarily prior art.

Vehicles, especially those designed for off-road applications, typically have a spare wheel and tire assembly (commonly referred to simply as a spare tire) mounted to an exterior of the vehicle. The spare tire is typically mounted to a rear of the vehicle and has a fixed vertical position on the vehicle relative to the ground. In some instances, the vertical position of the spare tire undesirably reduces rear ground clearance. In other instances, the vertical position of the spare tire undesirably reduces visibility through the rear windshield of the vehicle.

SUMMARY

This section provides a general summary of the disclosure, and is not a comprehensive disclosure of its full scope or all of its features.

In accordance with an aspect of the present disclosure, a carrier for a spare tire of a vehicle includes a base, a mount, and a locking member. The base is configured to be coupled to the vehicle. The mount is coupled to the base and pivotable relative to the base about a pivot axis. The mount is configured to support the spare tire for common rotation with the mount about the pivot axis. The pivot axis is offset from a central axis of the spare tire when the spare tire is supported by the mount. The locking member is movable between a locked position wherein the locking member engages the mount and the base to prevent relative movement therebetween, and an unlocked position wherein the mount is pivotable relative to the base.

In accordance with an aspect of the present disclosure, the locking member includes a lug bolt. When the locking member is in the locked position, the lug bolt is received through the mount and is fixedly coupled to the base.

In accordance with an aspect of the present disclosure, the lug bolt is configured to be received through a lug aperture of the spare tire.

In accordance with an aspect of the present disclosure, the mount includes a plurality of lug studs, each of the lug studs being configured to be received through a respective lug aperture of the spare tire.

In accordance with an aspect of the present disclosure, the carrier includes a resilient member coupled to the mount and to the base, the resilient member inhibiting rotation of the mount relative to the base when the locking member is in the unlocked position.

In accordance with an aspect of the present disclosure, the mount is rotatable between a high position and a low position relative to the base. The mount positions the spare tire to have a greater maximum height relative to the base when in the high position than when in the low position. The resilient member rotationally biases the mount toward the high position.

In accordance with an aspect of the present disclosure, the resilient member is a clockspring having one end coupled to the mount and another end coupled to the base.

In accordance with an aspect of the present disclosure, the carrier includes a detent. The detent engaging the mount when the mount is in a predetermined rotational position relative to the base to inhibit rotation of the mount away from the predetermined rotational position.

In accordance with an aspect of the present disclosure, the detent includes a detent member and a detent resilient member that biases the detent member into contact with the mount. The mount includes a groove that receives the detent member when the mount is in the predetermined position.

In accordance with an aspect of the present disclosure, the detent resilient member is a torsion spring having opposite ends respectively coupled to the base and the detent member.

In accordance with an aspect of the present disclosure, the base defines a pivot aperture and the mount includes a mount plate and a pivot member. The mount plate is configured to support the spare tire. The pivot member is fixedly coupled to the mount plate and is disposed about the pivot axis. The pivot member is rotatably received in the pivot aperture of the base and including a surface that defines the groove that receives the detent member.

In accordance with an aspect of the present disclosure, an outer radial surface of the pivot member defines the groove.

In accordance with an aspect of the present disclosure, the detent member is a wheel configured to roll along the surface of the pivot member.

In accordance with an aspect of the present disclosure, the mount includes a stop member and the base includes a mating stop member. The stop member engages the mating stop member to limit rotation of the mount relative to the base to a predetermined angular range.

In accordance with an aspect of the present disclosure, one of the mount and the base includes an upper stop member and a lower stop member, and the other of the mount and the base includes a mating stop member. The upper stop member engages the mating stop member when the mount is in a high position to inhibit rotation of the mount in a first rotational direction. The lower stop member engages the mating stop member when the mount is in a low position to inhibit rotation of the mount in a second rotational direction that is opposite the first rotational direction.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

The following description of the preferred embodiment(s) is merely exemplary in nature and is in no way intended to limit the invention, its application, or uses.

The present teachings are directed toward a carrier for a spare wheel and tire assembly (collectively referred to herein as a spare tire). The carrier adjustably mounts a spare tire to a vehicle. The carrier allows the spare tire to be positioned in a low position and a high position, relative to the ground. The carrier allows the spare tire to move between the low and high positions without removing the spare tire from the carrier.

Figure 1:
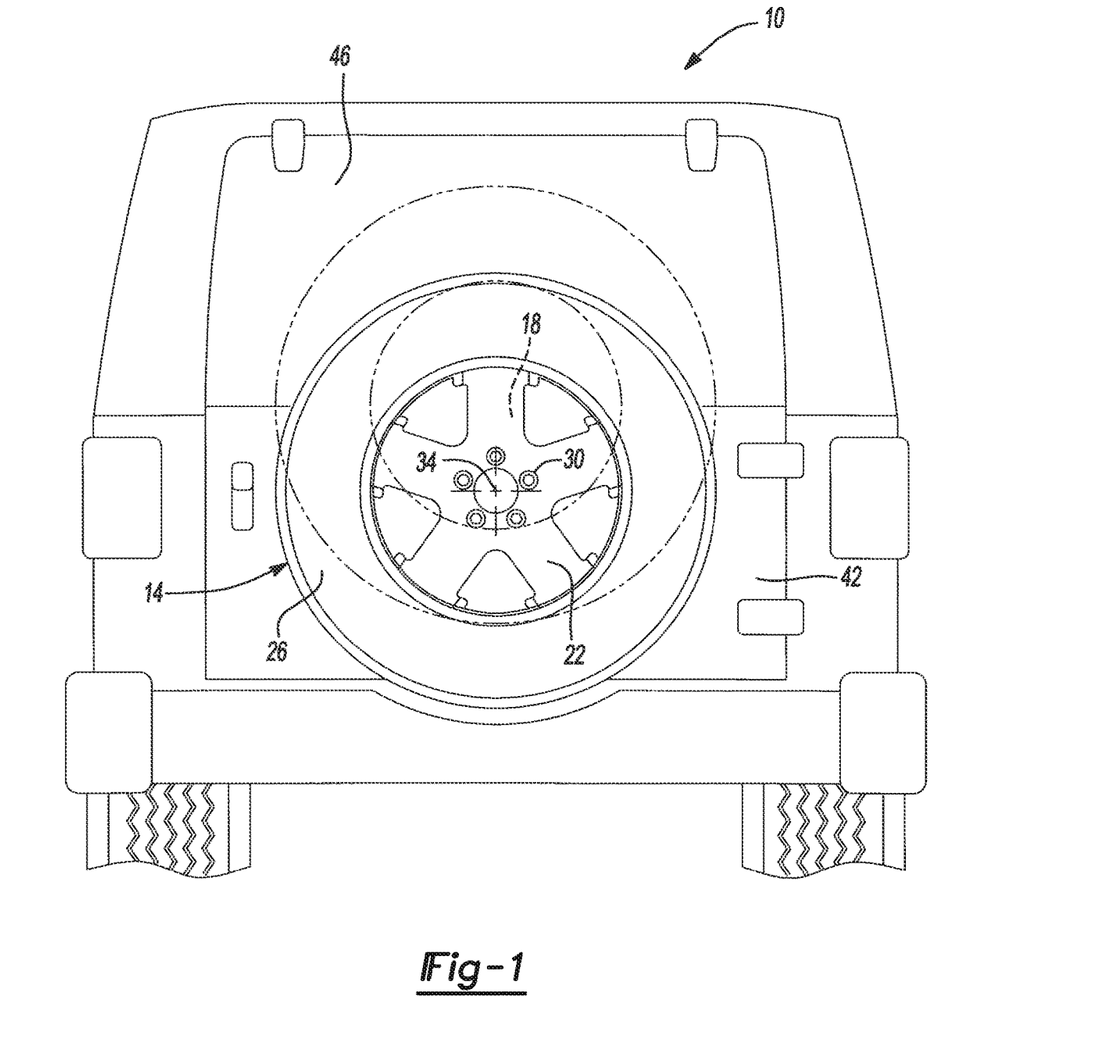
FIG. 1 is a rear plan view of an example vehicle including a spare tire and a spare tire carrier in accordance with the present teachings.

With reference to FIG. 1, a rear of an example of a vehicle 10 is illustrated and has a spare tire 14 and a spare tire carrier 18. The spare tire 14 includes a wheel 22 and a tire 26 mounted to the wheel 22. The wheel 22 includes a plurality of lug apertures 30 equally spaced about a central axis 34 of the spare tire 14. In the example provided, the wheel includes five lug apertures 30 and the carrier 18 is mounted to a tailgate 42 of the vehicle 10. The spare tire 14 is mounted to and supported by the carrier 18 such that the central axis 34 of the spare tire 14 is generally parallel to the longitudinal axis of the vehicle 10.

As discussed in greater detail below, the carrier 18 allows the spare tire 14 to be fixed in place in a plurality of positions. In a low position (shown in solid lines in FIG. 1), the spare tire 14 has a low ground clearance. In a high position (shown in dashed lines in FIG. 1), the spare tire 14 has a higher ground clearance than when the spare tire 14 is in the low position. The spare tire 14 overlaps less area of a rear windshield 46 of the vehicle 10 when in the low position than when in the high position to allow greater visibility through the rear windshield 46 when in the low position.

Figure 2:
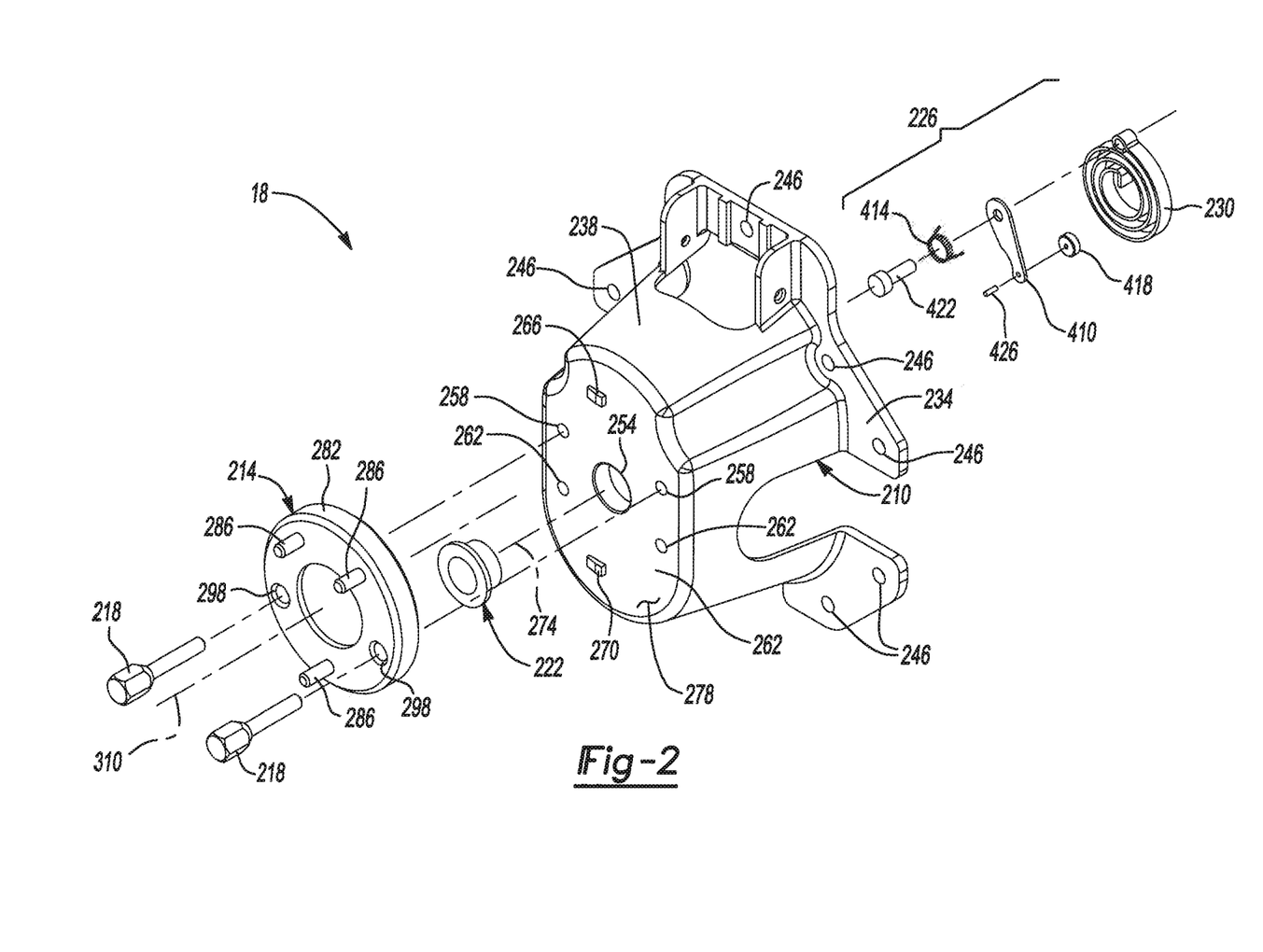
FIG. 2 is an exploded perspective view of the spare tire carrier of FIG. 1.
Figure 3:
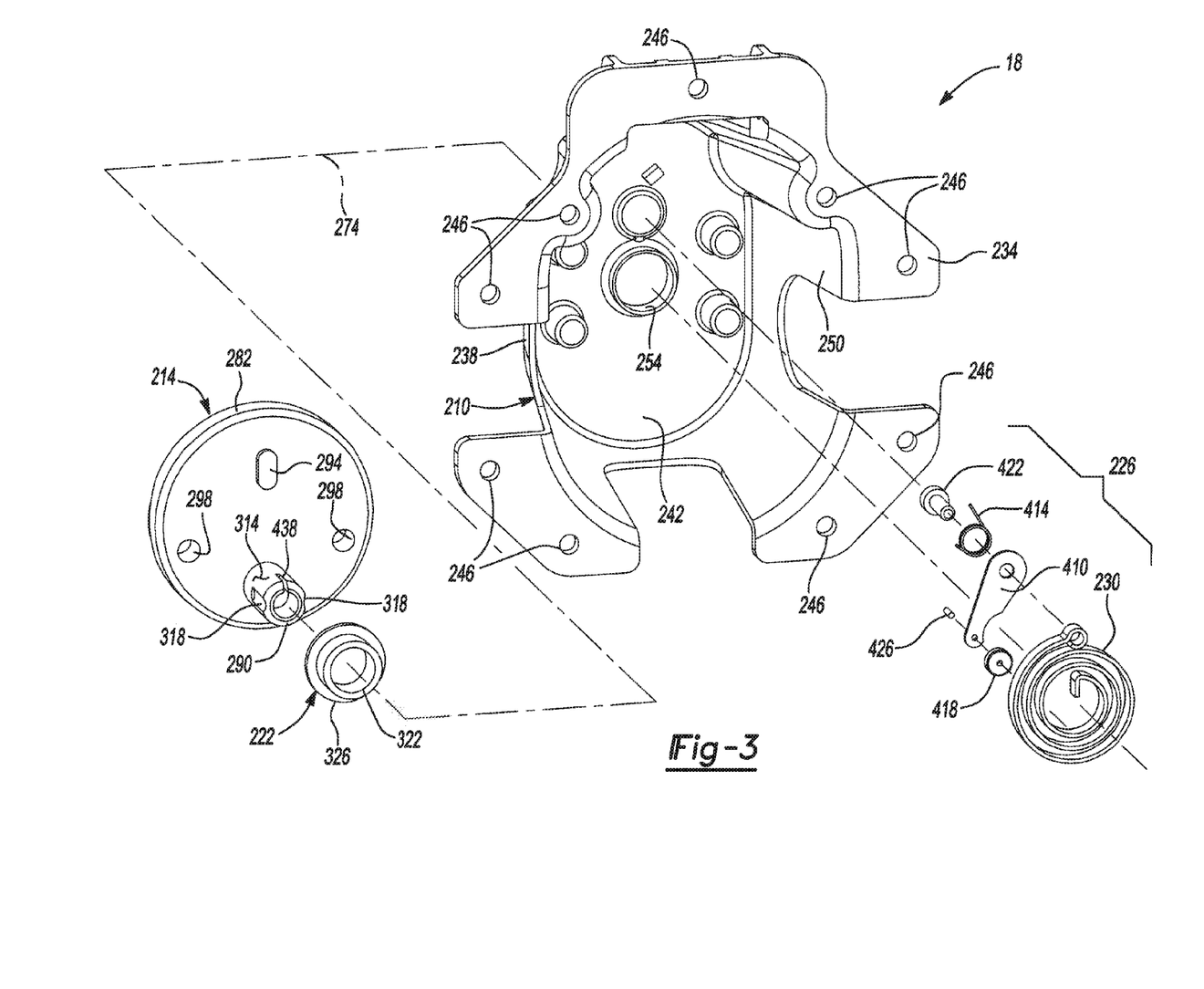
FIG. 3 is a different exploded perspective view of the spare tire carrier of FIG. 1.

With additional reference to FIGS. 2 and 3, the carrier 18 is illustrated in greater detail. The carrier 18 includes a base 210, a mount 214, and at least one locking member 218. In the example provided, the carrier 18 also includes a spacer 222, a detent 226 and a resistance device 230.

The base 210 includes a flange 234, an extension body 238, and a support wall 242. The flange 234 is a generally flat member, or series of flat members, that include a plurality of mounting apertures 246. The flange 234 generally abuts the tailgate 42 (FIG. 1) and screws or bolts (not specifically shown) are received through the mounting apertures 246 to fixedly couple the flange 234 to the tailgate 42 (FIG. 1). In the example provided, the flange 234 is separated into three segments that are fixedly coupled together by the extension body 238. The extension body 238 is fixedly coupled to the flange 234 and extends therefrom in the aft direction of the vehicle 10 to the support wall 242 to define a cavity 250.

The support wall 242 is fixedly coupled to the extension body 238 and spaced apart in the aft direction from the flange 234 by the extension body 238. The support wall 242 is generally flat and parallel to the flange 234. The support wall 242 includes a pivot aperture 254, an upper locking aperture 258, and a lower locking aperture 262. In the example provided, the support wall 242 also includes an upper stop 266 and a lower stop 270 and includes two of the upper locking apertures 258 and two of the lower locking apertures 262.

The pivot aperture 254 is a circular bore disposed about a pivot axis 274 and extending through the support wall 242. In the example provided, the locking member 218 is a lug bolt having external threads and the upper locking aperture 258 and lower locking aperture 262 have internal threads configured to mate with the external threads of the locking member 218. In the example provided, the carrier 18 includes two locking members 218 configured to mate with the two upper locking apertures 258 and the two lower locking apertures 262.

The upper stop 266 and the lower stop 270 generally protrude in the aft direction from an aft surface 278 of the support wall 242. The pivot aperture 254 is disposed between the upper stop 266 and the lower stop 270. In the example provided, the upper stop 266 is diametrically opposed to the lower stop 270 relative to the pivot aperture 254 such that the upper stop 266 and lower stop 270 are spaced apart by 180° about the pivot axis 274.

The mount 214 includes a mount plate 282, a plurality of lug studs 286, and a pivot member 290. In the example provided, the mount 214 also includes a stop member 294. The mount plate 282 includes at least one lug bore 298 extending through the mount plate 282. The lug studs 286 are fixedly coupled to the mount plate 282 and extend in the aft direction from the mount plate 282. Each of the lug studs 286 is externally threaded and configured to mate with a lug nut (not specifically shown). In the example provided, the mount plate 282 is a generally disc shaped body, includes two lug bores 298, and three lug studs 286 that extend in the aft direction from the mount plate 282.

The lug bores 298 and lug studs 286 are equally circumferentially spaced about a central axis 310 of the mount plate 282 and each lug bore 298 and lug stud 286 aligns with a respective one of the lug apertures 30 of the spare tire 14. Each lug stud 286 is received through one of the lug apertures 30 when the spare tire 14 is supported by the carrier 18 and a respective lug nut is threadably received on each lug stud 286 to secure the spare tire 14 to the carrier 18. Each lug bore 298 aligns with a respective one of the upper locking apertures 258 when the carrier 18 is in the high position. Each lug bore 298 aligns with a respective one of the lower locking apertures 262 when the carrier 18 is in the low position. The central axis 310 of the mount plate 282 is coaxial with the central axis 34 of the spare tire 14 when the spare tire 14 is supported by the carrier 18.

In an alternative construction, not specifically shown, the lug studs 286 on the mount 214 are replaced with threaded bores. In such a construction, a plurality of lug bolts are received through the lug apertures 30 and threaded into the threaded bores of the mount 214 to secure the spare tire 14 to the mount 214.

The pivot member 290 is fixedly coupled to the mount plate 282 and extends therefrom in the fore direction of the vehicle 10. The pivot member 290 is a generally cylindrical shape disposed about the pivot axis 274 and received through the pivot aperture 254 of the support wall 242. The pivot axis 274 is parallel to and offset from the central axis 310 of the mount plate 282. An outer radial surface 314 of the pivot member 290 includes a pair of grooves 318 at predetermined angular positions. In the example provided, the grooves 318 are diametrically opposed to each other.

The spacer 222 is an annular shape disposed about the pivot member 290 and includes a main body 322 and a lip 326. The main body 322 is disposed radially between the support wall 242 and the pivot member 290 and within the pivot aperture 254 to facilitate rotation of the pivot member 290 relative to the support wall 242. The lip 326 extends radially outward from the main body 322 to be axially between the aft surface 278 of the support wall 242 and the mount plate 282 to space the mount plate 282 axially apart from the aft surface 278. In another aspect of the present invention, the spacer 222 could be understood as either a bushing or as a bearing.

The stop member 294 extends in the fore direction from the mount plate 282 and is configured to engage the upper stop 266 and the lower stop 270 to prevent rotation of the mount plate 282 past the upper or lower stops 266, 270.

Figure 4:
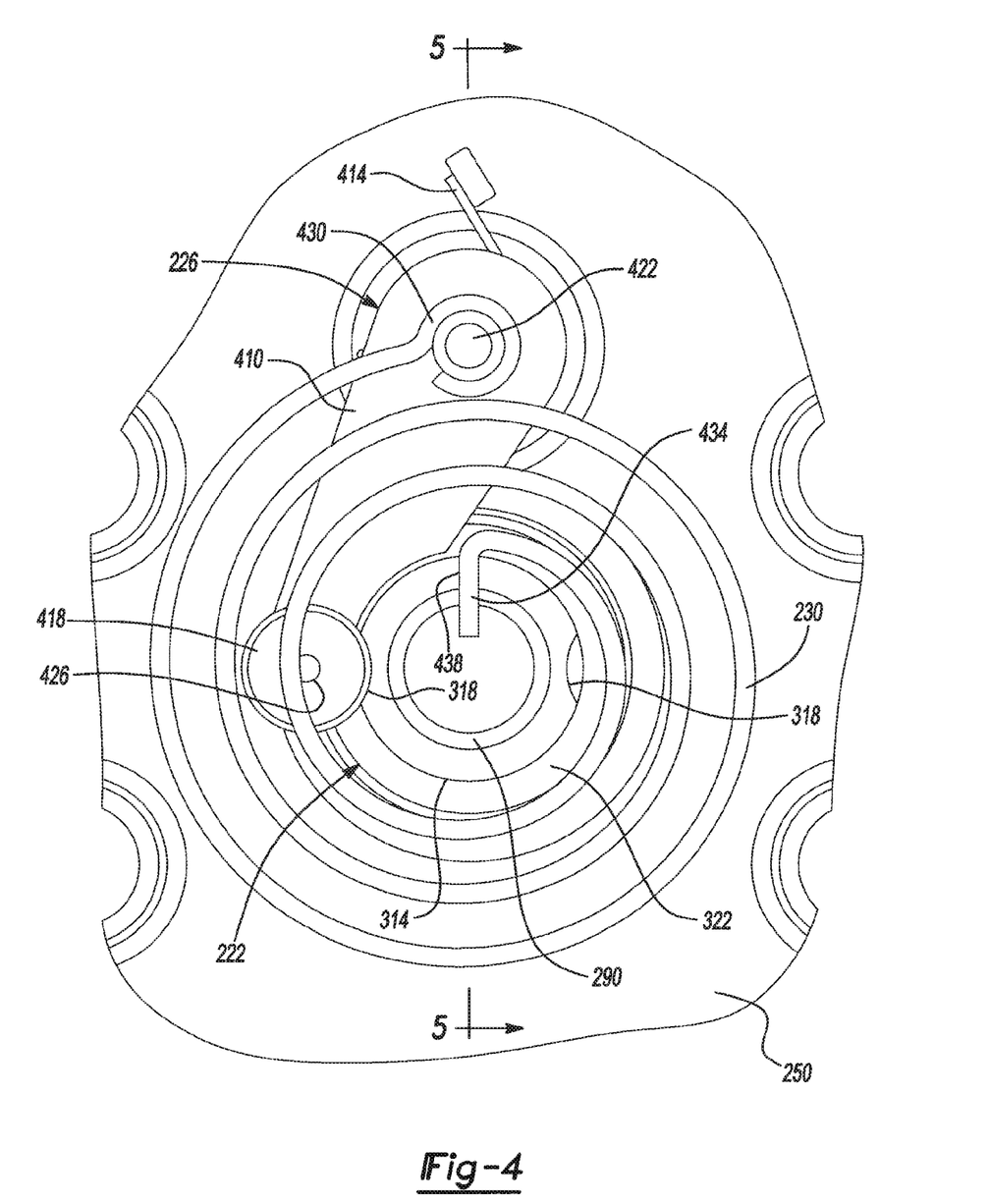
FIG. 4 is a plan view of a portion of the spare tire carrier of FIG. 1.
Figure 5:
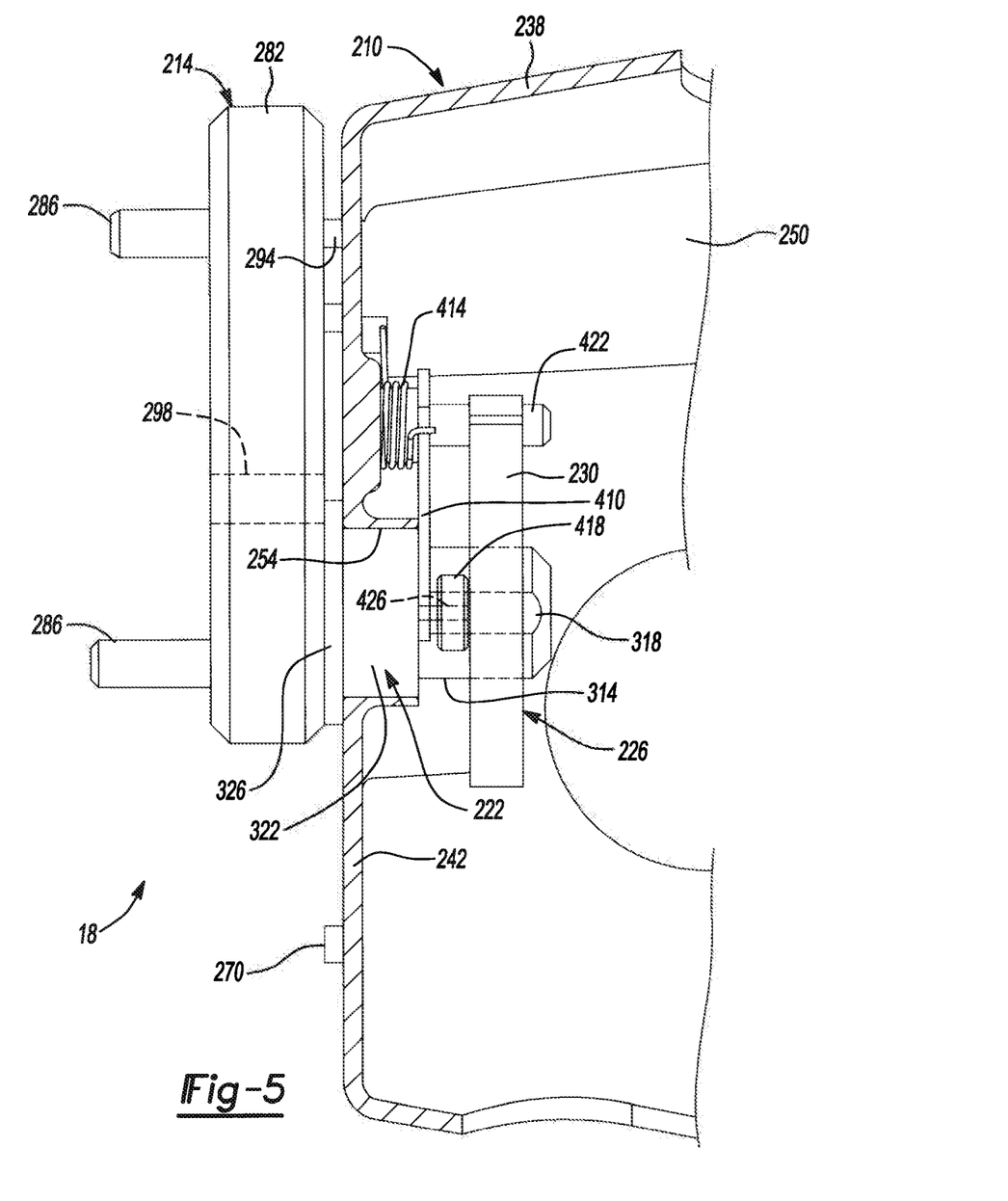
FIG. 5 is a partial sectional view of a portion of the spare tire carrier of FIG. 1, taken generally along line 5-5 shown in FIG. 4.

With additional reference to FIGS. 4 and 5, the detent 226 is illustrated in greater detail. The detent 226 is generally disposed within the cavity 250. The detent 226 is generally configured to inhibit rotation of the mount 214 when the mount 214 is positioned in a predetermined rotational position (e.g., the high or low position). In the example provided, the detent 226 is a mechanism that includes an arm 410, a detent resilient member 414 and a detent member 418. The arm 410 is pivotably coupled to the support wall 242 by a pin 422 that extends in the fore direction from the support wall 242. In the example provided, the detent member 418 is a wheel coupled to an end of the arm 410 that is distal to the pin 422 and is coupled to the arm 410 for rotation relative to the arm 410 about a pin 426. The detent member 418 is configured to be received in the grooves 318 of the pivot member 290. The detent resilient member 414 is configured to bias the arm 410 toward the pivot member 290 to cause the detent member 418 to contact (and in the example provided, roll along) the outer radial surface 314 of the pivot member 290 and be received in the grooves 318 when in the predetermined positions. In the example provided, the detent resilient member 414 is a torsion spring disposed about the pin 422 and having opposite ends that respectively engage the support wall 242 and the arm 410 to rotationally bias the arm 410 such that the detent member 418 remains in contact with the outer radial surface 314 of the pivot member 290.

The resistance device 230 is generally configured to rotationally bias the mount 214 toward the high position. In the example provided, the resistance device 230 is a clockspring having one end 430 coupled to the support wall 242 (e.g., via the pin 422), and an opposite end 434 coupled to the pivot member 290 for common rotation about the pivot axis 274. In the example provided, the opposite end 434 is received in a slot 438 in the outer radial surface 314 of the pivot member 290.

Figure 6:
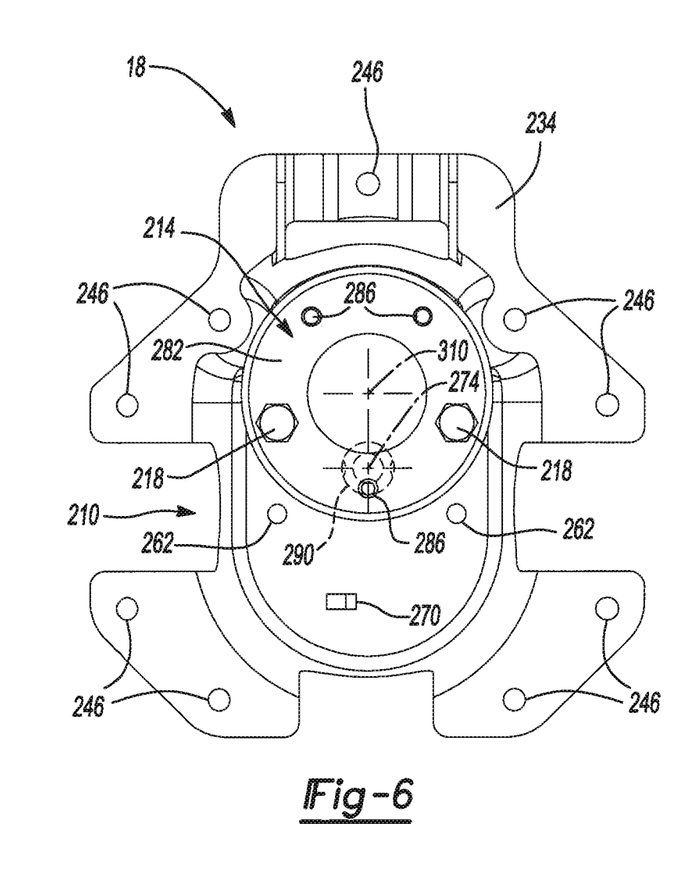
FIG. 6 is a rear plan view of the spare tire carrier of FIG. 1, illustrating a mount in a high position.
Figure 7:
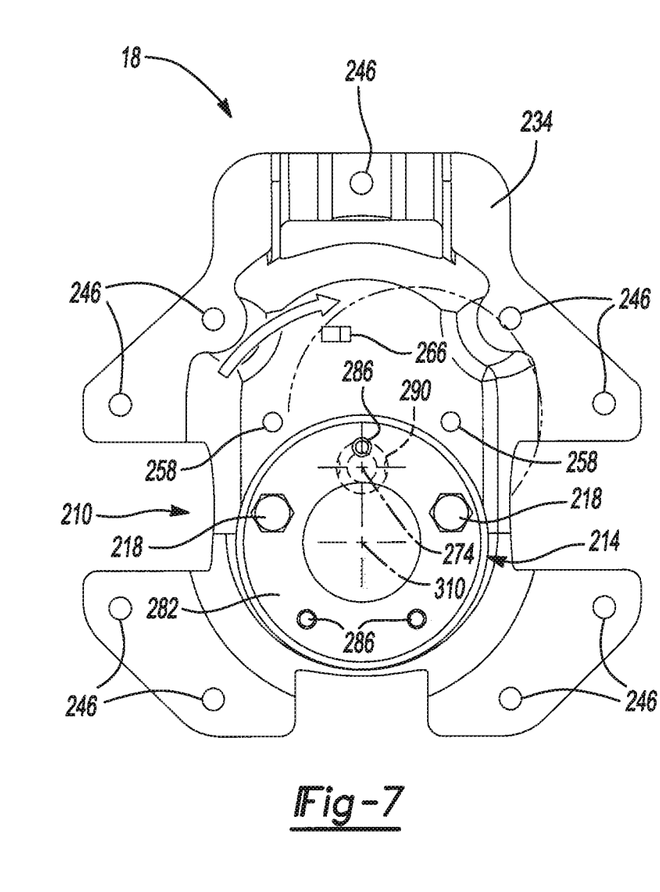
FIG. 7 is a rear plan view similar to FIG. 6, illustrating the mount in a low position.

With additional reference to FIGS. 6 and 7, the mount 214 is shown in the high position (FIG. 6) and the low position (FIG. 7). With the locking members 218 removed, the spare tire 14 (FIG. 1) is mountable to the mount plate 282. The lug studs 286 are received through the lug apertures 30 (FIG. 1) to support the spare tire 14 (FIG. 1) on the mount 214. The lug nuts (not specifically shown) are then threaded onto the lug studs 286 to secure the spare tire 14 (FIG. 1) to the mount 214. With the spare tire 14 (FIG. 1) secured to the mount 214, the mount 214 is rotatable about the pivot axis 274 (FIGS. 2-5) between the high position and the low position.

In the example provided, the mount 214 is rotated in a clockwise direction about the pivot axis 274 to move from the high position to the low position, and the mount 214 is rotated in a counterclockwise direction to move from the low position to the high position. The upper stop 266 prevents the mount 214 from rotating in the counterclockwise direction past the high position and the lower stop 270 prevents the mount 214 from rotating in the clockwise direction past the low position. In an alternative construction, the mount 214 is rotated in a counterclockwise direction about the pivot axis 274 to move from the high position to the low position, and the mount 214 is rotated in a clockwise direction to move from the low position to the high position. Similarly, the upper stop 266 prevents the mount 214 from rotating in the clockwise direction past the high position and the lower stop 270 prevents the mount 214 from rotating in the counterclockwise direction past the low position.

In the high position, the lug bores 298 align with the upper locking apertures 258 (FIG. 2). The mount 214 is rotationally fixed relative to the base 210 in the high position by inserting the locking members 218 through the lug apertures 30 (FIG. 1), through the lug bores 298, and threading the locking members 218 into the upper locking apertures 258 (FIG. 2). In the example provided, a center of gravity of the spare tire 14 is located along the central axis 310 centered directly above the pivot axis 274 when in the high position such that the weight of the spare tire 14 does not create a rotational moment about the pivot axis 274 toward the low position. In an alternative construction, not specifically shown, the mount 214 is configured such that the center of gravity of the spare tire 14 is slightly offset from the pivot axis 274 when in the high position, to create a moment about the pivot axis 274 toward the upper stop 266.

When the mount 214 is in the high position, the detent member 418 (FIG. 5) is received in one of the grooves 318 (FIG. 5) to resist rotation of the pivot member 290 (FIG. 5) when the locking members 218 are not received in the upper locking apertures 258. The resistance device 230 (FIG. 5) also biases the mount 214 rotationally toward the high position to inhibit the spare tire 14 (FIG. 1) from falling to the low position when the locking members 218 are removed from the upper locking apertures 258 (FIG. 2). The resistance device 230 (FIG. 5) has a biasing force that is sufficient to prevent the mount 214 from freefalling to the low position, while still allowing a person to easily rotate the spare tire 14 (FIG. 1) with the mount 214 between the high and low positions.

In the low position, the lug bores 298 align with the lower locking apertures 262 and the mount 214 is rotationally fixed relative to the base 210 by inserting the locking members 218 through the lug apertures 30, through the lug bores 298, and threading the locking members 218 into the lower locking apertures 262. When the mount 214 is in the low position, the detent member 418 (FIG. 5) is received in one of the grooves 318 (FIG. 5) to resist rotation of the pivot member 290 (FIG. 5) when the locking members 218 are not received in the lower locking apertures 262.

In an alternative construction, not specifically shown, the support wall 242 defines additional locking apertures configured to align with the lug bores 298 when the mount 214 is rotated to additional predetermined positions relative to the base 210 that are different from the high and low positions (e.g., rotationally between the high and low positions). In one such construction, the pivot member 290 includes additional grooves that correspond to the additional predetermined positions and the detent member 418 is also configured to inhibit rotation of the pivot member 290 away from these additional predetermined positions when received in the additional grooves.

Thus, the spare tire carrier 18 allows a user to mount the spare tire 14 to the vehicle 10 in a plurality of positions (e.g., the high and low positions) and to move the spare tire 14 between these positions without removing the spare tire 14 from the spare tire carrier 18.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A carrier for a spare tire of a vehicle, the carrier comprising:
   a base configured to be coupled to the vehicle;
   a mount coupled to the base and pivotable relative to the base about a pivot axis between a high position and a low position relative to the base, the mount being configured to support the spare tire for common rotation with the mount about the pivot axis such that the mount positions the spare tire to have a greater maximum height relative to the base when in the high position than when in the low position, the pivot axis being parallel to and offset from a central axis of the spare tire when the spare tire is supported by the mount for common rotation about the pivot axis; and
   a lug member,
   wherein when the mount is in the high position the lug member is movable between an unlocked position and a first locked position wherein the lug member extends through a first lug aperture of the spare tire and a first aperture of the mount while engaging the base to prevent rotation of the mount relative to the base;
   wherein when the mount is in the low position the lug member is movable between the unlocked position and a second locked position wherein the lug member extends through a second lug aperture of the spare tire and a second aperture of the mount while engaging the base to prevent rotation of the mount relative to the base; and
   wherein when the lug member is in the unlocked position the lug member is disengaged from the base to permit the mount to pivot relative to the base between the high position and the low position.

2. The carrier of claim 1, wherein the lug member includes a lug bolt, wherein when the lug member is in the first or second locked position, the lug bolt extends through the mount and is threadably coupled to the base.

3. The carrier of claim 1, wherein the first lug aperture of the spare tire is a same one of a plurality of lug apertures of the spare tire as the second lug aperture.

4. The carrier of claim 1, wherein the mount includes a plurality of lug studs, each of the lug studs being configured to extend through a respective one of a plurality of lug apertures of the spare tire when the lug member extends through the first or second lug aperture of the spare tire.

5. The carrier of claim 1, further comprising a resilient member coupled to the mount and to the base, the resilient member inhibiting rotation of the mount relative to the base when the lug member is in the unlocked position.

6. The carrier of claim 5, wherein the resilient member rotationally biases the mount toward the high position.

7. The carrier of claim 5, wherein the resilient member is a clockspring having one end coupled to the mount and another end coupled to the base.

8. The carrier of claim 1, further comprising a detent, the detent engaging the mount when the mount is in a predetermined rotational position relative to the base to inhibit rotation of the mount away from the predetermined rotational position.

9. The carrier of claim 8, wherein the detent includes a detent member and a detent resilient member that biases the detent member into contact with the mount, wherein the mount includes a groove that receives the detent member when the mount is in the predetermined rotational position.

10. The carrier of claim 9, wherein the detent resilient member is a torsion spring having opposite ends respectively coupled to the base and the detent member.

11. The carrier of claim 9, wherein the base defines a pivot aperture and the mount includes a mount plate and a pivot member, the mount plate being configured to support the spare tire, the pivot member being fixedly coupled to the mount plate and disposed about the pivot axis, the pivot member being rotatably received in the pivot aperture of the base, the pivot member including a surface that defines the groove that receives the detent member.

12. The carrier of claim 11, wherein an outer radial surface of the pivot member defines the groove.

13. The carrier of claim 11, wherein the detent member is a wheel configured to roll along the surface of the pivot member.

14. The carrier of claim 1, wherein the mount includes a stop member and the base includes a mating stop member, the stop member engaging the mating stop member to limit rotation of the mount relative to the base to a predetermined angular range.

15. The carrier of claim 1, wherein one of the mount and the base includes an upper stop member and a lower stop member, and the other of the mount and the base includes a mating stop member, the upper stop member engaging the mating stop member when the mount is in the high position to inhibit rotation of the mount in a first rotational direction, and the lower stop member engages the mating stop member when the mount is in the low position to inhibit rotation of the mount in a second rotational direction that is opposite the first rotational direction.

* * * * *